UNITED STATES PATENT OFFICE.

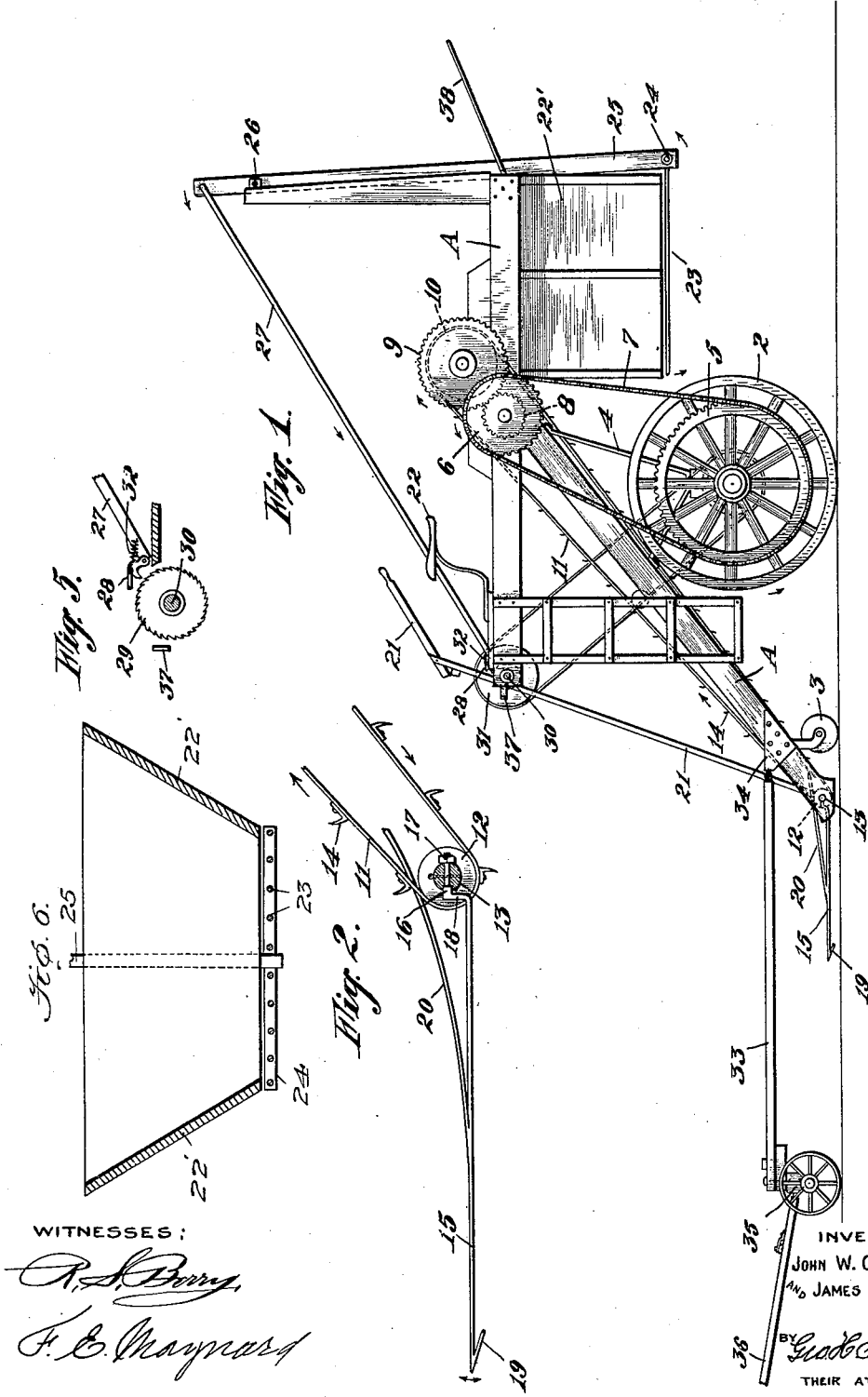

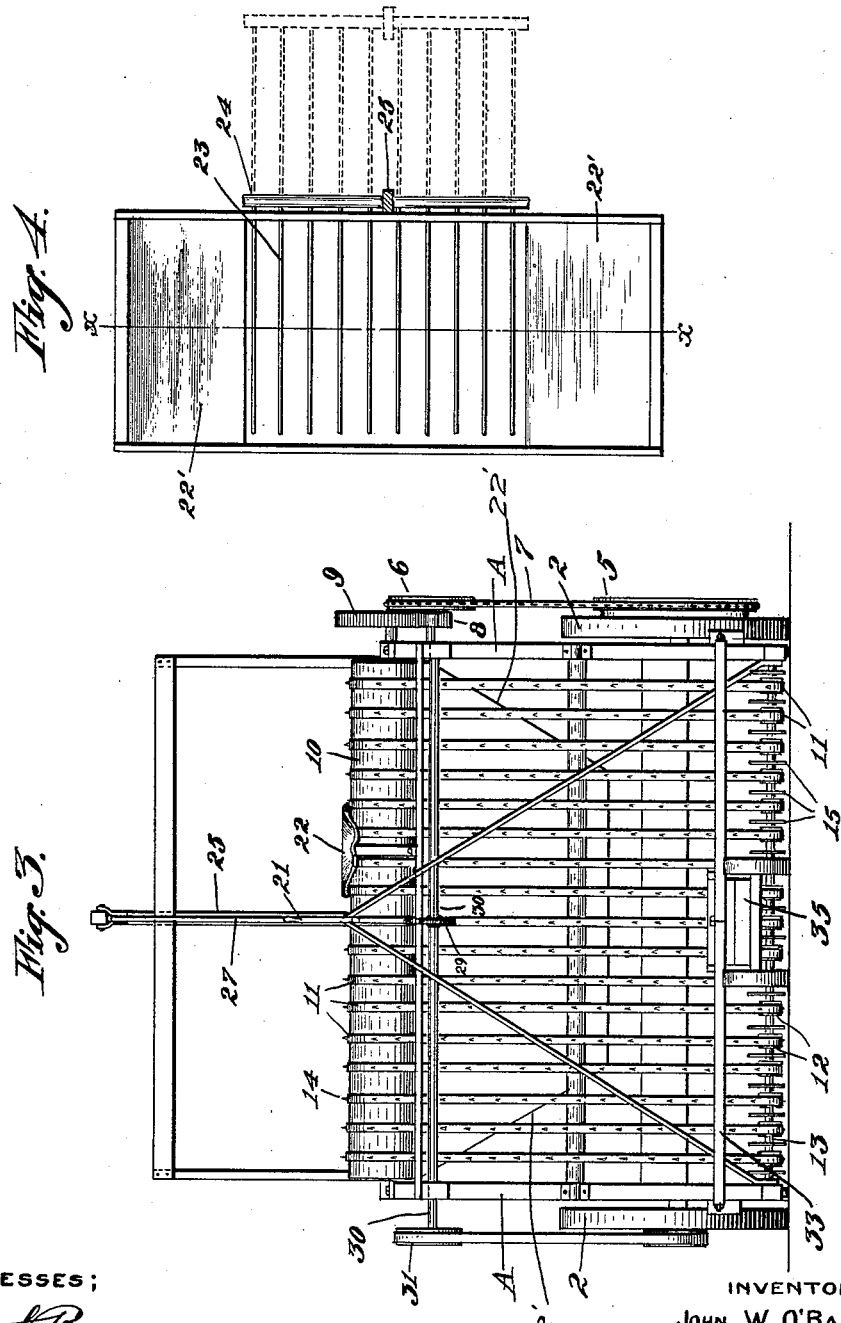

JOHN W. O'BANION, OF WELLINGTON, AND JAMES NICHOL, OF YERINGTON, NEVADA.

HAY RAKING AND BUNCHING MACHINE.

1,007,378.  Specification of Letters Patent.  Patented Oct. 31, 1911.

Application filed July 3, 1909. Serial No. 505,912.

*To all whom it may concern:*

Be it known that we, JOHN W. O'BANION, of Wellington, Lyon county, State of Nevada, and JAMES NICHOL, of Yerington, Lyon county, Nevada, both citizens of the United States, have invented new and useful Improvements in Hay Raking and Bunching Machines, of which the following is a specification.

This invention relates to a hay raking and bunching machine.

It is the object of this invention to provide a machine that will gather scattered hay, straw, and the like, such as is mown and left in the field to dry, and deposit it in cocks or wagons, thus saving time and labor in the harvesting of the crop.

A further object is to provide a hay raking and bunching machine that is simple in construction and efficient in operation.

The invention consists of the parts and the construction and combination of parts as hereinafter more fully described and claimed, having reference to the accompanying drawings, in which—

Figure 1 is a side elevation of the invention. Fig. 2 is a detail of the tines and conveyer. Fig. 3 is a front elevation. Fig. 4 is a detail of the discharge hopper in plan. Fig. 5 is a detail of the mechanism for emptying the hopper. Fig. 6 is a sectional view of the receiving hopper on the line $x$—$x$ of Fig. 4.

In the drawings, A is the frame of the machine which is mounted on a running gear consisting of vehicle wheels 2 mounted on a suitable hub, and forerunner 3. Springs 4 are interposed between the frame A and the running gear 2. A sprocket 5 on the wheel 2 is connected to a sprocket 6 by a chain 7, the sprocket 6 carrying a toothed pinion 8 which meshes with the toothed wheel 9 securely mounted on the shaft of the roller 10. This roller 10 extends across the frame of the machine and is designed to carry a number of conveyer belts 11 which pass on an incline down the front of the machine and around idler pulleys 12 mounted loosely on a shaft 13 in the lower forward portion of the frame A. These belts 11 are provided with a number of spurs 14 which are distributed at intervals upon the outer surface of the belts, and are formed with a slight curvature, as shown in Fig. 2.

Rigidly secured to the shaft 13, between the pulleys 12, are tines 15 which form the rake or gathering portion of the machine. These tines have square shanks, at 16, where they pass through the shaft 13 and are secured to the latter by means of bolts 17. As this supporting point of the tines is slightly elevated above the ground surface, the tine is bent downward, as at 18, so that the outwardly projecting portion 15 may normally lie close to the ground. Runners 19 are formed on the outer ends of the tines for the purpose of preventing the points entering the ground as the machine is moved forward. An upwardly and backwardly inclined member 20 is welded to the tines at a point approximately midway of its length and terminates above the pulley 12 and between the belts 11.

A lever 21 is connected to the shaft 13, and is situated near the driver's seat 22, the purpose of which is to allow the driver to raise or lower the outer ends of the tines 15 by turning the shaft 13 in its bearings in the frame A. To the rear of and under the roller 10, a hopper 22' is provided, the sides of which slope inwardly toward the bottom or discharge. The discharge end of the hopper 22' is normally closed by a movable bottom consisting of rods or prongs 23 secured at one end to a head 24 mounted on the lower end of a swinging lever 25 pivoted at 26. A rod 27 is connected to the upper end of the swinging lever 25 and has a pawl or dog 28 at its lower end, as shown in Fig. 5, which is adapted to engage with a ratchet wheel 29 mounted on a shaft 30 and constantly rotated through the pulley 31 by a belt connected with the running gear 2. The pawl 28 is retained normally out of engagement with the ratchet 29 by means of a spring 32, and is caused to engage the ratchet by pressure being applied to the outer end of the pawl, as may be done by the foot of the driver. The pawl, on becoming engaged with the ratchet wheel, is caused to move forward, thus pulling upon the rod 27 and swinging the lever 25 on its pivot 26 so as to remove the pronged bottom 23 from beneath the hopper discharge. The draft bar 33 is connected to the frame A, at 34, and extends forward, as shown in Fig. 1, the front end being pivotally mounted on a truck 35, to which the tongue 36 is attached.

In operation, as the machine is moved forward over a field of mown hay, the tines 15 pass under the hay, gathering it up, and depositing it upon the conveyer belts 11. These belts are rotated by the roller 10 which is revolved through the gears 6—9 and chain 7 from the running gear 2. The spurs 14 engage the hay and carry it upward on the conveyer belts, where it is dumped over the roller 10 and deposited in the hopper 22'. When the hopper is filled, the operator places his foot upon the pawl 28, engaging it with the ratchet 29, thus withdrawing the pronged bottom from under the hopper 22', as before described, thereby releasing the hay from the hopper and depositing it in a pile. The pawl 28 is disengaged from the ratchet by means of a stop 37, thus allowing the prongs 23 to swing back under the hopper 22' by gravity. A guide 38 insures the swinging lever traveling in a true course.

Having thus described our invention, what we claim and desire to secure by Letters Patent is—

1. A hay and like collecting and bunching apparatus, including an inclined sided receiver having a movable bottom, pivoted swinging arms upon which said bottom is carried, a controlled latching mechanism therefor, an inclined endless carrier adapted to discharge into the receiver, collecting fingers adapted to discharge upon the lower end of the carrier, a wheeled vehicle upon which the apparatus is mounted, and mechanism actuated in unison with the movements of the vehicle to swing the arms and bodily retract the bottom of the receiver.

2. A hay and like collecting apparatus, including a wheeled vehicle, a receiver supported from the frame, an inclined, endless traveling carrier adapted to discharge into the receiver, collecting fingers in the line of travel in front of, and adapted to deliver material to, the bottom of the carrier, vertical swinging arms fulcrumed above the rear of the receiver, horizontally disposed, parallel fingers carried by the arms and extensible beneath the receiver to form a bottom therefor, a revoluble ratchet, and a panel and rod connection with the swinging arms whereby the bottom may be withdrawn and the contents deposited in a mass.

In testimony whereof we have hereunto set our hands in the presence of two subscribing witnesses.

JOHN W. O'BANION.
JAMES NICHOL.

Witnesses:
ROBERT RUGLE,
ADDSON BAILY.

---

Copies of this patent may be obtained for five cents each, by addressing the "Commissioner of Patents, Washington, D. C."